350-3.61 SR

XR 3,989,530

TX 3032C

United States Patent [11] 3,989,530

Robillard [45] Nov. 2, 1976

[54] PROCESS FOR RECORDING PHASE HOLOGRAMS USING ENERGY-ACTIVATED SENSITIZER

[76] Inventor: Jean Jules Achille Robillard, 4, Chemin des Fleurs, 01-Ferney Voltaire, France

[22] Filed: Feb. 11, 1976

[21] Appl. No.: 657,280

Related U.S. Application Data

[63] Continuation of Ser. No. 452,555, March 19, 1974, abandoned.

[52] U.S. Cl. .................... 96/27 H; 96/27 E; 96/35.1; 96/45.2; 96/90 PC; 350/3.5

[51] Int. Cl.[2] .................... G03C 5/04; G03C 5/00; G02B 27/08

[58] Field of Search .................... 96/27 H, 27 R, 27 E, 96/48 R, 45.2, 115 R, 115 P, 35.1, 90 PC; 350/3.5

[56] References Cited

UNITED STATES PATENTS

| | | | |
|---|---|---|---|
| 3,617,274 | 3/1968 | Lin | 96/27 H |
| 3,655,256 | 4/1972 | Claytor et al. | 350/3.5 |
| 3,658,526 | 4/1972 | Haugh | 96/27 H |
| 3,689,264 | 9/1972 | Chandross et al. | 96/35.1 |
| 3,707,371 | 12/1972 | Files | 96/27 H |
| 3,723,121 | 3/1973 | Hauser | 96/48 R |
| 3,820,995 | 6/1974 | Meatens et al. | 96/90 PC |
| 3,926,637 | 12/1975 | Bartolini et al. | 96/115 R |

*Primary Examiner*—Edward C. Kimlin
*Attorney, Agent, or Firm*—James D. Halsey, Jr.; H. J. Staas

[57] ABSTRACT

Phase holograms are recorded in the visible with high efficiency by the use of a transparent photosensitive recording composition containing a transparent thermochromic electrochromic or photochromic compound capable of forming a chromatic sensitizer temporarily in situ in the composition when under the influence of external physical excitation appropriate to the nature of the compound, namely heat, an electric field or irradiation. In the process of recording, the physical excitation is applied and maintained during the duration of the recording, whereafter the physical excitation is terminated and the recording composition becomes transparent again leaving the recording constituted solely by local refractive index variations.

8 Claims, No Drawings

3989530
OR IN 96/27H

PROCESS FOR RECORDING PHASE HOLOGRAMS USING ENERGY-ACTIVATED SENSITIZER

This is a continuation of application Ser. No. 452,555 filed Mar. 19, 1974, now abandoned.

The present invention concerns a new high-efficiency process of recording holograms, which does not necessitate wet development, as well as new photosensitive compositions utilized in this process.

To obtain a high efficiency in phase holograms (Bragg holograms), it is necessary that the said holograms should be recorded in the form of local variations in refractive index alone, in the absence of any concurrently introduced optical absorption. In visual observation, under normal lighting, the recorded film should therefore be completely transparent.

It is known on the other hand that conventional photographic recording is expressed by variations of optical density due to a variable absorption connected for example with the presence of silver grains. Such a process is therefore unsuitable for recording phase holograms.

One of the processes currently employed for recording phase holograms is the method called the "bleaching" method, which utilizes a conventional silver halide method followed by a wet method treatment, the purpose of which is to convert the silver grains formed into a silver halide different from the original one and therefore having a different index (see, for example, Upatniek Juris et al., Applied Optics, 8, 85, 1969).

This method has a certain number of disadvantages; the volume occupied by the new silver halide grains formed from the silver grains is different from the initial volume of these silver grains, whereby voids are formed in the emulsion, causing a diffusion of light, considerably reducing the efficiency of the hologram.

On the other hand, the recording of holograms in the visible necessitates the presence in the emulsion of chromatic sensitizers necessarily introducing an optical absorption considerably reducing the efficiency of the holograph.

Another more direct method is that called "polymer degradation" (see for example W. J. Tomlinson et al., Applied Physics Letters, 16, 486, 1970) in which use is made of the internal modifications of a polymer due to the action of the light for producing a variation in refractive index. Here again, the record may be sensitized in the visible by means of chromatic sensitizers, introducing the same disadvantages as in the preceding case.

A third process of recording phase holograms is that using lacunar copolymerisation (see J. Robillard, French Patent No. 70 37,371). This process is based on a variation in the refractive index of the material due to the trapping of photoelectrons by the illumination of the laser, in the vicinity of structural defects in the body of the polymer. This process, like the others, necessitates a chromatic sensitizer for recording in the visible.

In a general manner, all the processes actually used for recording phase holograms necessitate a chromatic sensitizer for recording in the visible. They therefore all introduce a certain optical absorption which diminishes the efficiency of the recorded holograms.

It is the object of the present invention to provide an improved process of recording in the visible high-efficiency phase holograms without introducing optical absorption due to the presence of a chromatic sensitizer.

It is also the object of the invention to provide new compositions for recording phase holograms and utilizable in the process of the invention.

The invention concerns an improved process of recording in the visible phase holograms by the use of a transparent photosensitive recording composition sensitized in the visible by a chromatic sensitizer, characterized in that the chromatic sensitizer is formed in situ and is maintained in the composition by a physical means for the duration of recording the hologram then, after recording, the action of the said physical means responsible for the presence of the sensitizer in the composition is interrupted, so that the recording composition becomes transparent again and the record is formed solely of local variations of refractive index.

According to the particular embodiments of the process of the invention, the physical means consists of heating, an electric field or irradiation by ultraviolet rays.

The invention also concerns compositions useful for carrying out the process of the invention comprising a transparent photosensitive composition capable of being sensitized in the visible and of undergoing a variation of refractive index by exposure in the visible and a chromatic sensitizer for the said composition, characterised in that it contains a transparent compound selected from thermochrome, electrochrome and photochrome compounds capable of forming temporarily in situ in the composition a sensitizer which is chromatic under the action of an external physical excitation, such as heating, an electric field or irradiation by ultraviolet rays according to the nature of the said compound.

The "thermochrome" compounds utilizable in the invention comprise certain transparent substances which, under the action of heat, are capable of producing and maintaining, for the duration of heating, a chromatic sensitizer (colored form of the thermochrome compound) capable of sensitizing in the visible a photosensitive process of index variation. With this kind of compound, it is sufficient to heat, by any appropriate means, the photosensitive medium during recording for sensitizing the photosensitive composition. When heating is stopped, after recording, the material becomes transparent again and contains the halogram in the form of index variations.

The electrochrome compounds utilizable in the invention comprise certain transparent substances which, under the action of an electric field, are capable of producing and maintaining for the period of application of the electric field, a chromatic sensitizer (colored form of the electrochrome compound) capable of sensitizing in the visible a photosensitive process of index variation. With this kind of compound, it will suffice to place the photosensitive emulsion between two plates of conducting glass (Nesa glass, for example) and to apply thereto an electric field during recording. When one ceases to apply this field, after recording, the material becomes transparent again and contains the hologram in the form of index variations.

The photochrome compounds utilizable in the invention comprise certain transparent substances which, under the action of an auxiliary ultraviolet radiation, are capable of producing and maintaining for the duration of the radiation a chromatic sensitizer (colored form of the photochrome compound) capable of sensitizing in the visible a photosensitive process of index variation. With this kind of compound, it is sufficient to irradiate the photosensitive emulsion with ultraviolet radiation of wave length such that this radiation does not produce directly the change of index, but only the production of a chromatic sensitizer during the recording in visible light. When the UV irradiation, after recording, is stopped the material becomes transparent again and contains the hologram in the form of index variation.

The photosensitive compositions which may be used in combination with the thermochrome electrochrome or photochrome compounds of the invention, may be of a very diverse nature. It is sufficient if these compositions can be sensitized in the visible by colored forms of the said compounds corresponding to their excited state, and are the seat of refractive index variations during their exposure to visible light.

As particular examples of utilizable photosensitive compositions, it is possible to mention photopolymerizable compositions such as the systems polyvinyl acetate/vinyl sorbate (U.S. Pat. No. 2,892,716), systems based on polyhexamethylene adipamide (U.S. Pat. No. 2,972,540), systems based on $\beta$-diethylamino ethyl polymethacrylate (British Pat. No. 802,853) systems based on polychlorophene (U.S. Pat. No. 3,024,180), systems based on polyethylene oxide/polyethyleneglycol acrylate (U.S. Pat. No. 3,060,025), systems based on 9-vinylcarbazole and carbon tetrachloride (Notley N., Photographic Science and Engineering 14, 19, 1970); photodegradable compositions (J. Giulani, Double Liaison, 164, 176, 1969), for example based on methyl polymethacrylate (Tomlinson, W. J., Applied Physics Letters, 16, 486, 1970); substances resulting from the copolymerisation of at least two monomers possessing different numbers of lateral active groups, such as those described in French Pat. No. 70 37,371. It is well understood that this list is by no means exhaustive and that the invention is not limited to the photosensitive compositions specified.

As examples of thermochrome materials which, according to the invention, are capable of being utilized for the induced chromatic sensitization of an index variation process, it is possible to mention certain spiropyrans. In particular, benzothiazoline spiropyrans of the general formula

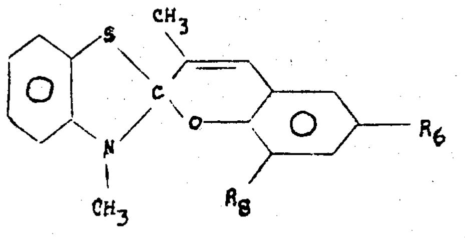

where $R_6$ and $R_8$ are hologens, for example Cl,Br.

It is also possible to mention certain derivatives of polymethine dyes, in particular those having the general formula:

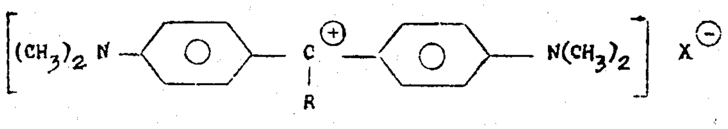

where $X^-$ is an anion and R may be selected from the following radicals:

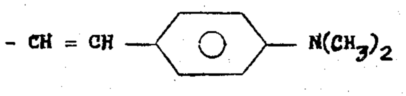

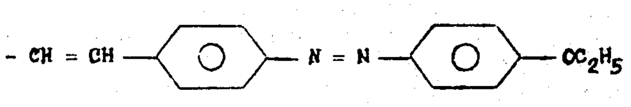

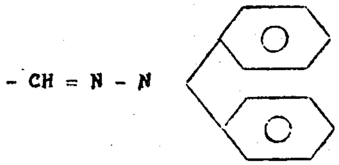

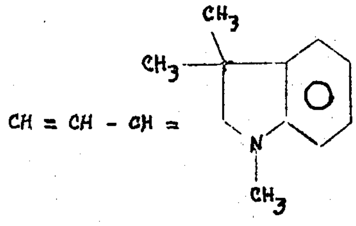

It is also possible to utilize certain pyrylium oxides and in particular 1,3 diphenyl-2-benzopyrilium-4-oxide:

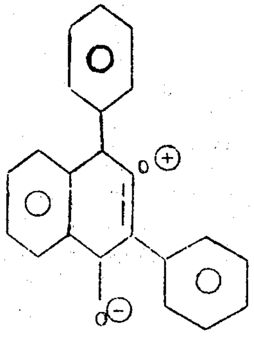

As example of the electrochrome materials which, according to the invention, are capable of being utilized for induced chromatic sensitization of an index variation process, it is possible to mention methylviologen of the formula:

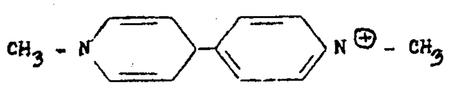

It is also possible to mention certain sydnones, for example N-(3-pyridyl)-sydnone.

As example of photochrome materials which, according to the invention, are capable of being utilized for induced chromatic sensitization of an index-variation process, it is possible to mention the benzothiazolin spiropyrans of the general formula:

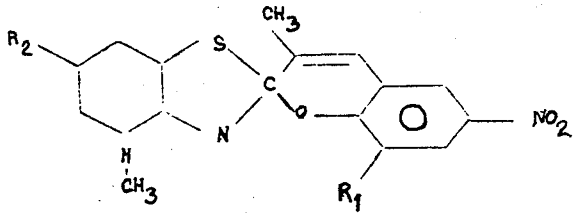

where we may have, for example:

| | | | | | |
|---|---|---|---|---|---|
| $R_1$ | = | $CCH_3$ | $R_2$ | = | $CCH_3$ |
| $R_1$ | = | $SCH_3$ | $R_2$ | = | $SCH_3$ |
| $R_1$ | = | $OCH_3$ | $R_2$ | = | $SCH_3$ |
| $R_1$ | = | $SCH_3$ | $R_2$ | = | $OCH_3$ |

It is also possible to mention the indoline spiropyrans of the general formula:

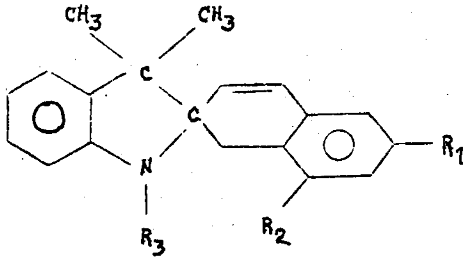

$R_1 = NO_2$, Cl, Br
$R_2 = OCH_3$, Cl, Br
$R_3 = (CH_3)_2$, 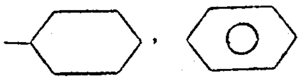

It is also possible to utilize the anils which are Schiff bases of the general formula:

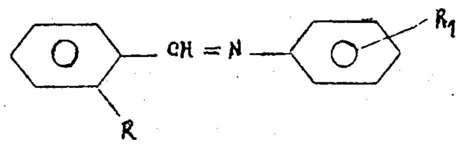

where R and $R_1$ may represent various substituents. An example of such anils is N-salycylidene-β-naphthylamine

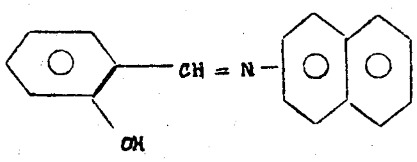

The following non-restrictive examples illustrate the preparation of compositions according to the invention.

EXAMPLE 1

This example illustrates the utilization of a thermochrome compound for the sensitization of an index variation recording material involving a polymerization:

A composition is prepared containing by weight

| | |
|---|---|
| Polyvinyl alcohol | 12% |
| Acrylamide | 8% |
| Triethanolamine | $2 \times 10^{-3}$ Mol |
| Spiro (methyl-3-chloro-6-chloro-8-benzo-2H pyran-2,2'-methyl-3'-benzo-thiazoline) | $4 \times 10^{-5}$ Mol |
| Water | 100 g |

This composition is coated on a glass plate to form a film 10μ thick. This plate is introduced in a thermostat at the temperature of 80° C during the holographic exposure so that the thermochrome spiro compound is converted into its colored form and acts as a chromatic sensitizer.

EXAMPLE 2

This example illustrates the utilization of an electrochrome compound for sensitizing an index-variation recording material involving polymerization:

A composition is prepared, containing by weight:

| | |
|---|---|
| Polyvinyl alcohol | 12% |
| Acrylamide | 8% |
| Triethanolamine | $2 \times 10^{-3}$ M |
| Methylviologen | $4 \times 10^{-5}$ M |
| Water | 100 g |

This composition is coated between two plates of conducting glass to form a layer 10μ thick, and a voltage of 15 volts is applied between the two glass plates whereby the electrochrome methylviologen is converted into its colored form and acts as a chromatic sensitizer at the moment of halographic exposure.

EXAMPLE 3

This example illustrates the utilization of a photochrome compound for sensitizing an index-variation recording material involving polymerization:

A composition is prepared, containing by weight:

| | |
|---|---|
| Polyvinyl alcohol | 12% |
| Acrylamide | 8% |
| Triethanolamine | $2 \times 10^{-3}$ M |

-continued

| | |
|---|---|
| Spiro (nitro-6-methoxy-8-benzo-2H, pyran-2,2'-dimethyl-3'-indoline) | $4 \times 10^{-5}$ M |
| Water | 100 g |

This composition is coated on a glass plate to form a film 10μ thick. This plate is exposed to an auxiliary ultraviolet radiation containing the wave-length 3,600 A (absorption band of spiropyran), filtered to eliminate the visible, during recording of the hologram whereby the photochrome spiro compound is converted into its colored form and acts as a chromatic sensitizer.

EXAMPLE 4

This example illustrates the utilization of a thermochrome compound for sensitizing an index-variation recording material of the type described in French Pat. No. 70 37,371:

A composition is prepared containing:

| | |
|---|---|
| Ethyl alcohol | 100 cc |
| Polectron (product of the copolymerisation of vinylpyrrolidone with ethyl acrylate)* | 10 g |
| Benzotriazole | 0.2 g |
| 1,3 diphenyl-2-benzopyrilium-4-oxide | $4 \times 10^{-5}$ M |

*Product sold by the General Aniline and Film Corporation.

This composition is coated on a glass plate to form a film 10μ thick. During holographic recording, the plate is introduced in a thermostat at the temperature of 100° C, at which temperature the thermochrome benzopyrilium compound is converted into its colored form and acts as a chromatic sensitizer.

EXAMPLE 5

This example illustrates the utilization of an electrochrome compound for sensitizing an index-variation recording material of the type described in French Pat. No. 70 37,371:

A solution is prepared containing:

| | |
|---|---|
| Water | 79 g |
| Acrylamide | 9.75 g |
| N-N'-Methylenebisacrylamide | 0.25 g |
| Potassium ferricyanide | 0.002 g |
| N-(3-pyridyl)-sydnone | 0.2 g |

to this solution there is added at the moment of coating a second solution containing:

| | |
|---|---|
| Water | 10 g |
| Ammonium persulphate | 0.5 g |

This composition is coated so as to produce a coating 10μ thick and a voltage of 50 volts is applied between the two glass plates at the moment of holographic exposure so that the electrochrome sydnone compound is converted into its colored form and acts as a chromatic sensitizer.

EXAMPLE 6

This example illustrates the utilization of a photochrome compound for sensitizing an index-variation recording material of the type described in French Pat. No. 70 37,371:

A composition is prepared containing:

| | | |
|---|---|---|
| Glycol styryl-acrylate | (20% solution) | 100 cc |
| α-methylbutyl-lithium | (2% solution) | 10 cc |
| N-salicylidene-β-naphthylamine | (1% solution) | 1 cc |

This composition is coated on a glass plate to form a film about 10μ thick. This plate is exposed to auxiliary ultraviolet radiation containing the wave-length 3,880 A (naphthylamine absorption band), filtered to eliminate the visible, during the recording of the hologram whereby the photochrome N-salicylidene-β-naphthylamine is converted into its colored form and acts as a chromatic sensitizer.

EXAMPLE 7

This example illustrates the utilization of a photochrome compound for sensitizing an index-variation recording material involving a photodegradation.

A composition is prepared containing by weight:

| | |
|---|---|
| Polymethylmethacrylate | 10% |
| Chloroform | 90% |
| 2-benzylbenzophenone | 0.5% |

This composition is coated on a glass plate to form a film 10μ thick. This plate is exposed to auxiliary ultraviolet radiation containing the wave-length 3,800 A (absorption band of 2-benzylbenzophenone), filtered to eliminate the visible, during recording of the hologram whereby the photochrome 2-benzylbenzophenone is converted into its colored form and acts as a chromatic sensitizer.

It is evident that the embodiments described are merely examples and that it would be possible to modify them, in particular by substitution of technical equivalents, without for that departing from the scope of the invention.

I claim:

1. A process for recording phase holograms by holographically exposing a layer of a transparent photosensitive recording composition to radiation in the visible light range for a period of time to effect a change in the index of refraction of said layer in correspondingly exposed areas, said recording composition being selected from photopolymerizable and photodegradable compositions, said recording composition is temporarily sensitized to said radiation by a chromatic sensitizer formed in situ and maintained in said recording composition by means of a sensitizing auxiliary energy outside said visible light range applied to said recording composition for the duration of said exposure, said duration being sufficient to cause a corresponding photopolymerization or photodegradation and effecting local variations of refractive index in the exposed areas of said recording composition, and then ceasing to apply said sensitizing energy to said recording composition, thereby effecting the disappearance of said sensitizer in said recording composition and returning said recording composition to its normally transparent state.

2. A process for recording phase holograms as in claim 1, wherein said recording composition includes a thermochrome compound which forms said chromatic sensitizer when said sensitizing auxiliary energy is thermal energy.

3. A process for recording phase holograms as in claim 1, wherein said recording composition includes a photochrome compound which forms said chromatic sensitizer when said sensitizing auxiliary energy is ultraviolet radiation.

4. A process for recording phase holograms as in claim 1, wherein said recording composition includes an electrochrome compound which forms said chromatic sensitizer when said sensitizing auxiliary energy is electrical energy applied across said recording composition.

5. A process for recording phase holograms, including the steps of:

preparing a normally transparent photosensitive recording composition, wherein said recording composition is selected from photopolymerizable and photodegradable compositions;

chromatically sensitizing said recording composition by applying a sensitizing energy outside the visible light range to said recording composition whereby a chromatic sensitizer is temporarily formed in situ and maintained therein;

holographically exposing said recording composition with radiation, in the visible light range, to effect local variations of refractive index in the exposed, sensitized areas of said recording composition;

desensitizing said recording composition by ceasing to apply said sensitizing energy to said recording composition, thereby returning said recording composition to its normally transparent state with local variations of index of refraction according to said step of holographic exposure.

6. A process for recording phase holograms as in claim 5, wherein said recording composition includes a thermochrome compound which forms said chromatic sensitizer when said sensitizing energy is thermal energy.

7. A process for recording phase holograms as in claim 5, wherein said recording composition includes a photochrome compound which forms said chromatic sensitizer when said sensitizing energy is ultraviolet radiation.

8. A process for recording phase holograms as in claim 5, wherein said recording composition includes an electrochrome compound which forms said chromatic sensitizer when said sensitizing energy is electrical energy applied across said recording composition.

* * * * *